United States Patent
Beutler et al.

(10) Patent No.: US 7,819,769 B2
(45) Date of Patent: Oct. 26, 2010

(54) VEHICLE DRIVELINE COMPONENT HAVING HEAT SINK FOR INCREASED HEAT REJECTION CAPABILITIES

(75) Inventors: Kevin R. Beutler, Columbiaville, MI (US); James P. Borowiak, Grand Blanc, MI (US); Gregory J. Hilker, Canton, MI (US); Rajendra D. Patil, Westland, MI (US); Jeffrey E. Rea, Ames, IA (US)

(73) Assignee: American Axle & Manufacturing, Inc., Detroit, MI (US)

( * ) Notice: Subject to any disclaimer, the term of this patent is extended or adjusted under 35 U.S.C. 154(b) by 712 days.

(21) Appl. No.: 11/764,444

(22) Filed: Jun. 18, 2007

(65) Prior Publication Data

US 2008/0312023 A1 Dec. 18, 2008

(51) Int. Cl.
*F16H 57/04* (2010.01)
(52) U.S. Cl. .......................... 475/161; 74/607
(58) Field of Classification Search ............... 475/161
See application file for complete search history.

(56) References Cited

U.S. PATENT DOCUMENTS

| | | | |
|---|---|---|---|
| 2,015,108 A | 9/1935 | Harper | |
| 3,138,222 A | 6/1964 | Dames | |
| 3,828,881 A | 8/1974 | Owen | |
| 6,123,175 A * | 9/2000 | Fett | 184/59 |
| 6,189,413 B1 * | 2/2001 | Morse et al. | 74/607 |
| 6,675,676 B2 | 1/2004 | Beutler | |
| 6,997,284 B1 | 2/2006 | Nahrwold | |
| 7,004,879 B2 | 2/2006 | Beutler | |
| 2006/0021463 A1 | 2/2006 | Peterson et al. | |
| 2006/0054411 A1 * | 3/2006 | Fett et al. | 184/6.22 |
| 2006/0213318 A1 | 9/2006 | Hibbler et al. | |

FOREIGN PATENT DOCUMENTS

| | | |
|---|---|---|
| GB | 1115446 A | 5/1968 |
| JP | 2001-119810 A | 4/2001 |
| JP | 10-2007-0046268 A | 5/2007 |

OTHER PUBLICATIONS

Written Opinion for International Application No. PCT/US2008/064219, dated Dec. 22, 2009.

* cited by examiner

*Primary Examiner*—Sherry L Estremsky
*Assistant Examiner*—Edwin A. Young
(74) *Attorney, Agent, or Firm*—Harness, Dickey & Pierce, P.L.C.

(57) ABSTRACT

An axle assembly that includes an axle housing assembly, a differential disposed in the axle housing assembly, an input pinion, a pair of axle shafts and a heat sink. The input pinion is coupled to the axle housing assembly and is configured to transmit a rotary input to the differential. The axle shafts are coupled to the differential and housed in the axle housing assembly. The heat sink is coupled to the axle housing assembly and is formed of a material having a thermal conductivity that is greater than that of the axle housing assembly. The heat sink does not consist entirely of a chrome plating, a zinc plating or a cadmium plating. A cover for an axle assembly is also provided.

17 Claims, 4 Drawing Sheets

VEHICLE DRIVELINE COMPONENT HAVING HEAT SINK FOR INCREASED HEAT REJECTION CAPABILITIES

FIELD OF THE INVENTION

The present invention generally relates to vehicle driveline components and more particularly to a vehicle driveline component, such as an axle assembly, having a heat sink that is configured to improve the rejection of heat from the vehicle driveline component.

Modernly, vehicle consumers have expressed a desire for vehicles having larger payloads and greater towing capacities. Given these parameters, it is desirable that such axle assemblies be capable of rejecting a sufficient quantity of heat to protect the lubricants within the axle assembly, as well as the seals and the power transmitting components of the axle assembly. It will be appreciated that the life of such lubricants, seals and components can be significantly shortened by exposure to elevated temperatures.

Accordingly, there remains a need in the art for an axle assembly having improved heat rejection capabilities.

SUMMARY OF THE INVENTION

In one form, the teachings of the present disclosure provide an axle assembly that includes an axle housing assembly, a differential disposed in the axle housing assembly, an input pinion, a pair of axle shafts and a heat sink. The input pinion is coupled to the axle housing assembly and is configured to transmit a rotary input to the differential. The axle shafts are coupled to the differential and housed in the axle housing assembly. The heat sink is coupled to the axle housing assembly and is formed of a material having a thermal conductivity of at least about 1.00 W/cm° K. The heat sink does not consist entirely of a chrome plating, a zinc plating or a cadmium plating.

In another form, the teachings of the present disclosure provide an axle assembly that includes an axle housing, a differential, an input pinion, a pair of axle shafts and a cover. The axle housing defines an aperture into which the differential is received. The input pinion is coupled to the axle housing and is configured to transmit a rotary input to the differential. The axle shafts are coupled to the differential. The differential transmits rotary power from the input pinion to the axle shafts. The cover closes the aperture in the axle housing and has a first layer, which is formed of a ferrous material, and a second layer that is formed of another material having a thermal conductivity that is greater than about 1.30 W/cm° K. The first and second layers are in thermal communication to transmit heat therebetween.

In yet another form, the teachings of the present disclosure provide an axle cover for an axle assembly. The axle cover includes a first member and a second member. The first member has a body portion and a flange portion that is disposed about a perimeter of the body portion. The body portion has a three-dimensionally contoured surface. The flange portion is configured to be coupled to an axle housing. The first member is formed of a first material having a first thermal conductivity. The second member is formed of a second material having a second thermal conductivity that is greater than the first thermal conductivity. The second member being coupled to the body of the first member. The second member does not consist entirely of a chrome plating, a zinc plating or a cadmium plating.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
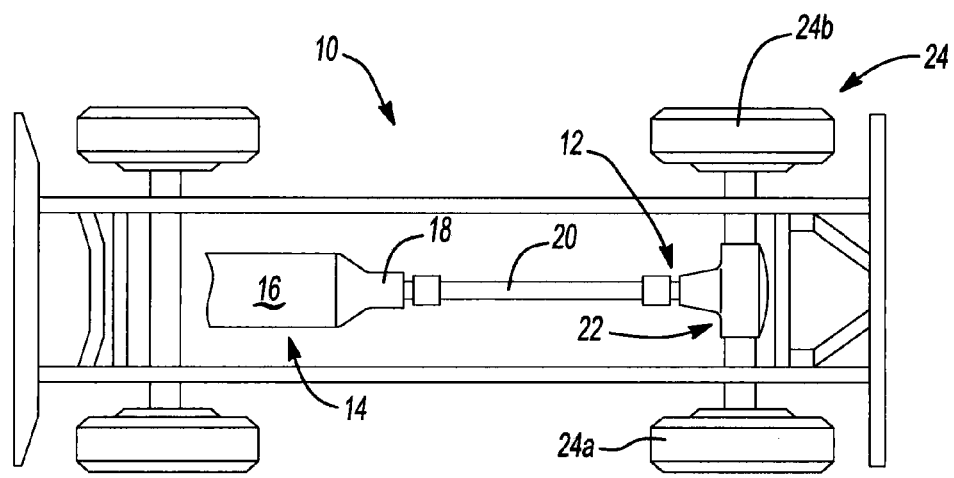
FIG. 1 is a schematic illustration of a vehicle having a rear axle constructed in accordance with the teachings of the present disclosure.

With reference to FIG. 1 of the drawings, a vehicle having a differential assembly that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a propshaft 20, a rear axle 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft 20 can be coupled for rotation with the output of the transmission 18. Drive torque can be transmitted through the propshaft 20 to the rear axle 22 where it can be selectively apportion in a predetermined manner to the left and right rear wheels 24a and 24b, respectively.

Figure 2:
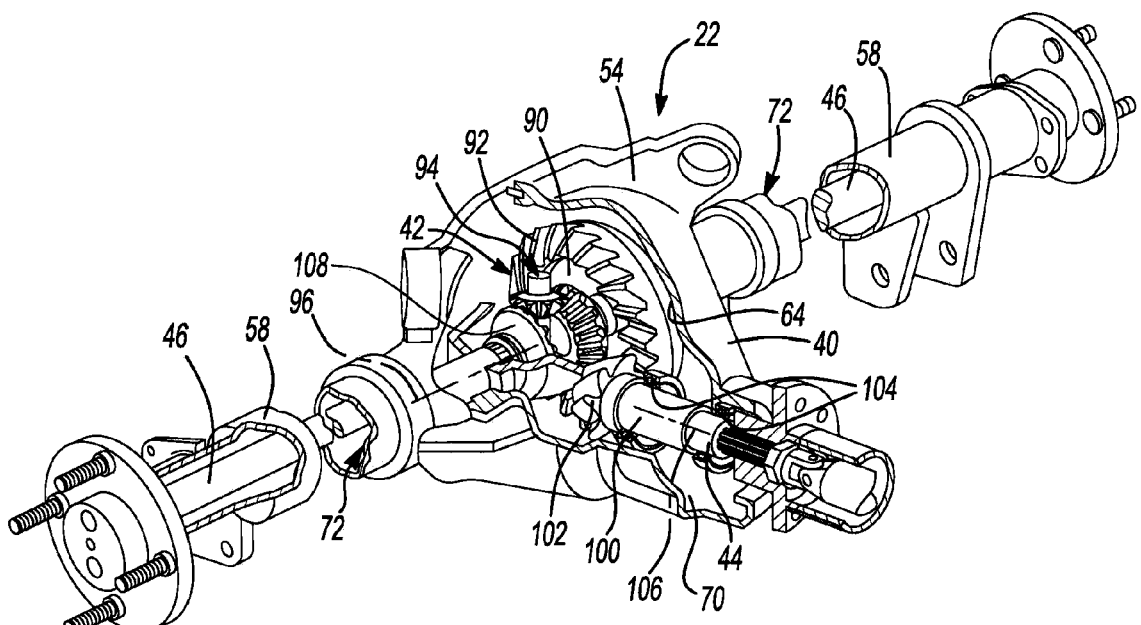
FIG. 2 is a partially broken-away perspective view of a portion of the vehicle of FIG. 1 illustrating the rear axle in more detail.
Figure 3:
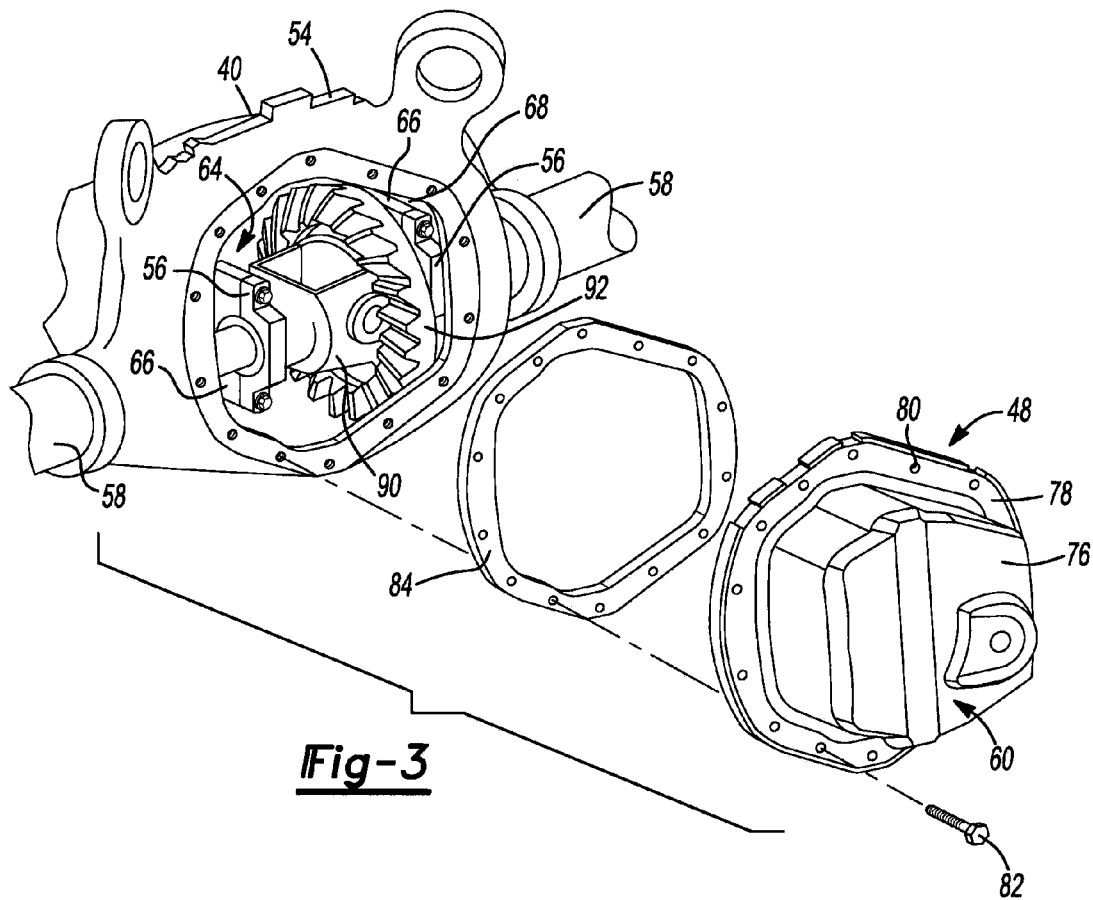
FIG. 3 is an exploded perspective view of the rear of the rear axle of FIG. 1.
Figure 4:
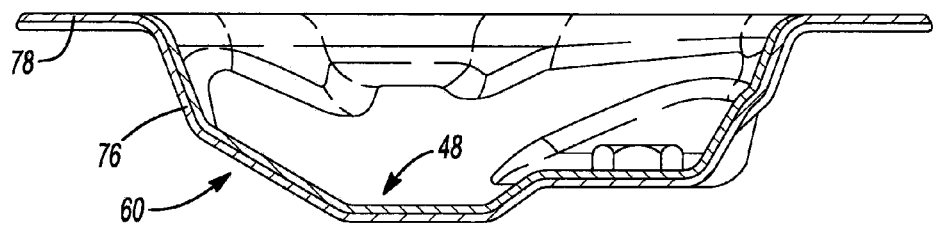
FIG. 4 is a cross-sectional view taken through a portion of the rear axle, illustrating the cover and the heat sink in more detail.

With reference to FIGS. 2 through 4, the rear axle 22 can include an axle housing assembly 40, a differential 42, an input pinion assembly 44, a pair of axle shafts 46, and a heat sink 48.

In the particular example provided, the axle housing assembly 40 includes a carrier housing 54, a pair of bearing caps 56, a pair of axle tubes 58 and a cover 60. The carrier housing 54 can define an internal cavity 64, a pair of bearing journals 66, a differential aperture 68, which can intersect the internal cavity 64 from a first side of the carrier housing 54, a pinion aperture 70, which can intersect the internal cavity from a second side of the carrier housing 54 opposite the differential aperture 68, and a pair of axle tube apertures 72 that can intersect the opposite lateral sides of the internal cavity 64. The bearing caps 56 can be removably coupled to the bearing journals 66. The axle tubes 58 can be received in the axle tube apertures 72 and can be fixedly coupled to the carrier housing 54. The cover 60 can include a body portion 76 and a flange portion 78 that can be coupled to the carrier housing 54. The body portion 76 can be three-dimensionally contoured (e.g., bulged outwardly) to effectively increase the volume within the differential axle housing assembly 40. The flange portion 78 can extend about the body portion 76 and in the particular example provided, includes a plurality of through holes 80 that permit the cover 60 to be removably coupled to the carrier housing 54 (via a plurality of threaded fasteners 82). It will be appreciated that a gasket 84 or a sealant (not shown), such as PERMATEX®, can be employed to seal the interface between the cover 60 and the carrier housing 54.

The differential 42 can be any appropriate vehicle differential and can conventionally include a case 90, a ring gear 92, which can be coupled to the case 90, and a gearset 94 that can be housed in the case 90. The differential 42 can be received into the internal cavity 64 through the differential aperture 68. The bearing journals 66 and the bearing caps 56 can cooperate to support the differential 42 for rotation in the internal cavity 64 about a first rotational axis 96.

The input pinion assembly 44 can conventionally include an input shaft 100 and an input pinion 102 that can be coupled for rotation with the input shaft 100. The input pinion assembly 44 can be received into the carrier housing 54 through the pinion aperture 70 such that the input pinion 102 is meshingly engaged to the ring gear 92. A pair of bearings 104 can be coupled to the carrier housing 54 and the input shaft 100 and can support the input pinion assembly 44 for rotation about a second rotational axis 106 that can be generally perpendicular to the first rotational axis 96. An end of the input shaft 100 opposite the input pinion 102 can be adapted to be coupled to a driveline component, such as the propshaft 20 (FIG. 1), to receive rotary power therefrom.

Each of the axle shafts 46 can be received through an associated one of the axle tubes 58 and can be coupled for rotation with an associated side gear 108 in the gearset 94 of the differential 42. Accordingly, it will be appreciated that rotary power input to the axle 22 via the input pinion assembly 44 is transmitted through the ring gear 92, to the case 90 and the gearset 94 and output to the axle shafts 46 to provide propulsive power to the left and right rear wheels 24a and 24b (FIG. 1).

Figure 5:
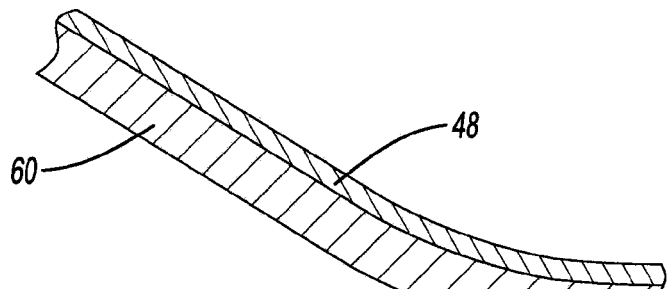
FIG. 5 is an enlarged portion of the sectional view of FIG. 4.
Figure 6:
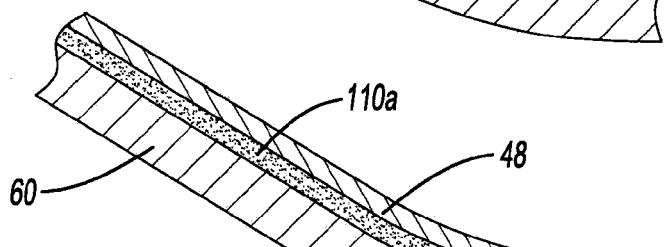
FIG. 6 is a portion of a cross-sectional view similar to that of FIG. 5 but illustrating the heat sink as coupled to the cover via an adhesive.
Figure 7:
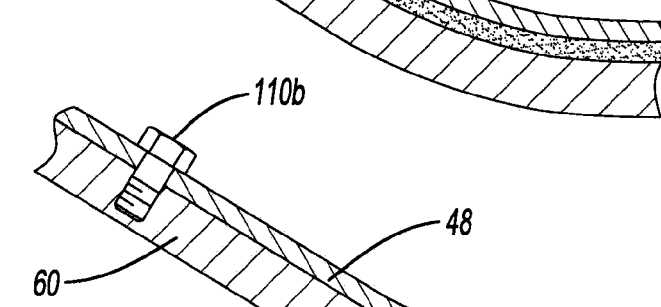
FIG. 7 is a portion of a cross-sectional view similar to that of FIG. 5 but illustrating the heat sink as coupled to the cover via threaded fasteners.
Figure 8:
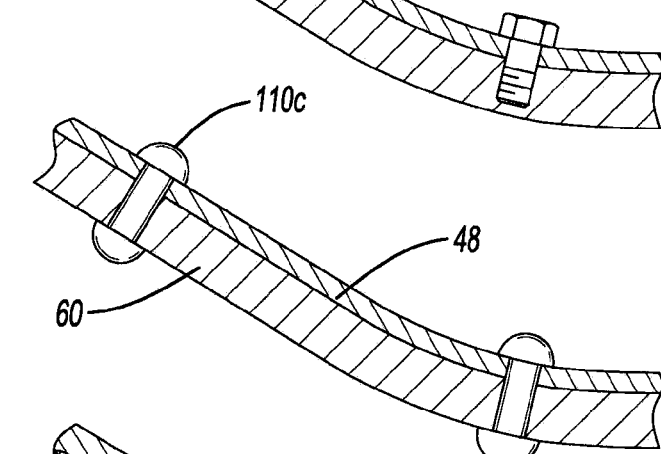
FIG. 8 is a portion of a cross-sectional view similar to that of FIG. 5 but illustrating the heat sink as coupled to the cover via rivets.
Figure 9:
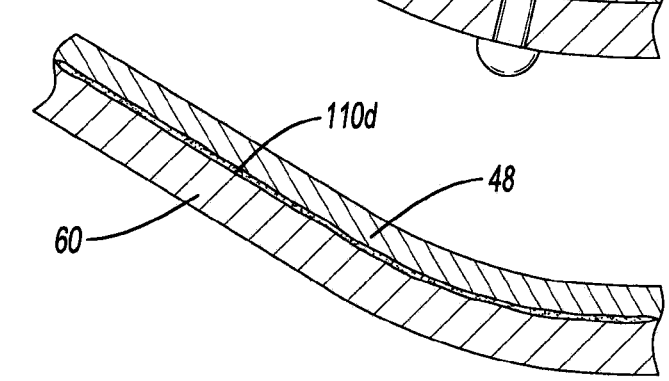
FIG. 9 is a portion of a cross-sectional view similar to that of FIG. 5 but illustrating the heat sink as coupled to the cover via a brazing compound.

With reference to FIGS. 3 through 5, the heat sink 48 can be coupled to a member of the axle housing assembly 40, such as the cover 60, and can be employed to aid in the rejection of heat from the axle housing assembly 40. The heat sink 48 can be formed onto the cover 60 in any appropriate manner, such as plating or dipping, or can be a discrete and separately formed structure that can be secured to the cover 60 through any appropriate means, such as thermally conductive adhesives 110a (FIG. 6), threaded fasteners 110b (FIG. 7), rivets 110c (FIG. 8), solder or brazing compound 110d (FIG. 9) and combinations thereof.

Generally, the cover 60 (or other portion of the axle housing assembly 40 to which the heat sink 48 is coupled) can be formed of a first material and the heat sink 48 can be formed of a second material having a thermal conductivity that is greater than a thermal conductivity of the first material. However, the heat sink 48 does not consist entirely of a chrome plating, a zinc plating or a cadmium plating. Non-limiting examples of suitable first and second materials are shown in the following table.

| First Material | Thermal Conductivity | Second Material | Thermal Conductivity |
|---|---|---|---|
| Steel | 0.45-0.65 W/cm° K. | Aluminum | 2.37 W/cm° K. |
| | | Copper | 4.01 W/cm° K. |
| | | Magnesium | 1.56 W/cm° K. |
| Cast Iron | 0.76 W/cm° K. | Aluminum | 2.37 W/cm° K. |
| | | Copper | 4.01 W/cm° K. |
| | | Magnesium | 1.56 W/cm° K. |
| Aluminum | 2.37 W/cm° K. | Copper | 4.01 W/cm° K. |

Preferably, the second material has a thermal conductivity that is greater than about 1.30 W/cm° K. if the first material is a ferrous material.

Figure 10:
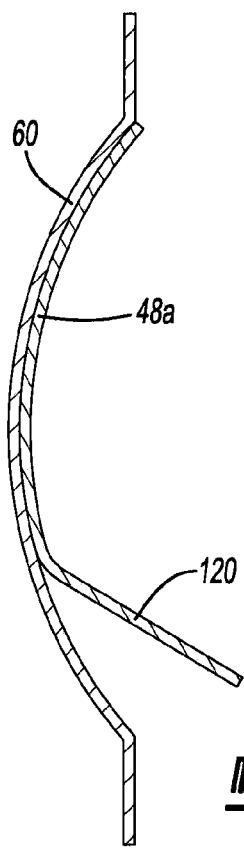
FIG. 10 is a sectional view of a portion of another axle constructed in accordance with the teachings of the present disclosure, the axle having a heat sink having fingers that extend into the internal cavity of the carrier housing.
Figure 11:
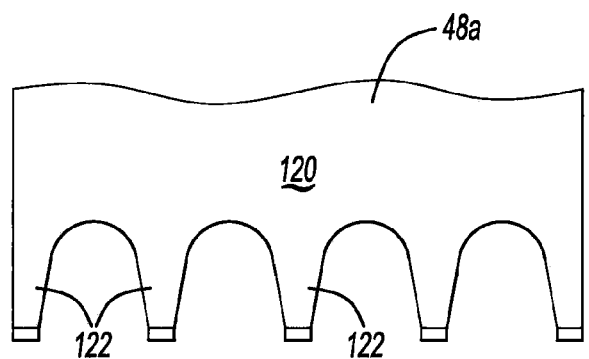
FIG. 11 is a front view of a portion of the axle of FIG. 10 illustrating the fingers of the heat sink in more detail.

In the example provided, the heat sink 48 co-extends with a portion of the cover 60 (e.g., the body portion 76). It will be appreciated, however, that a portion of the heat sink 48 could diverge from the portion of the axle housing assembly 40 to which the heat sink 48 is coupled. For example, the heat sink 48a could include an outwardly flared portion 120 as illustrated in FIGS. 10 and 11. In this example, the outwardly flared portion 120 includes a plurality of fingers 122 that are received into the internal cavity 64 in the carrier housing 54 where they are submerged in a lubricating oil (not shown). The fingers 122 can facilitate the rejection of heat from the sump in which the lubricating oil is disposed.

Figure 12:
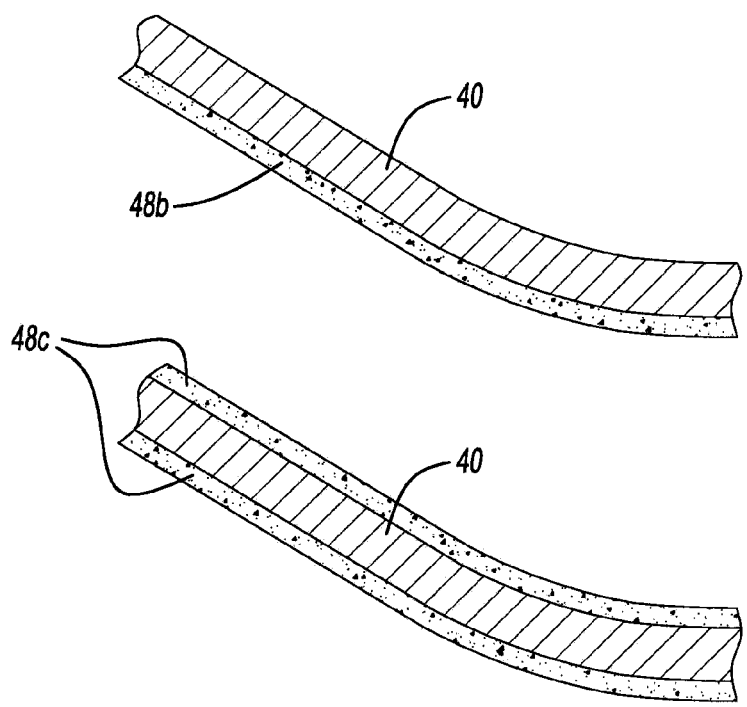
FIG. 12 is a cross-sectional view similar to that of FIG. 5 but illustrating the heat sink as coupled to the exterior of the cover.
Figure 13:
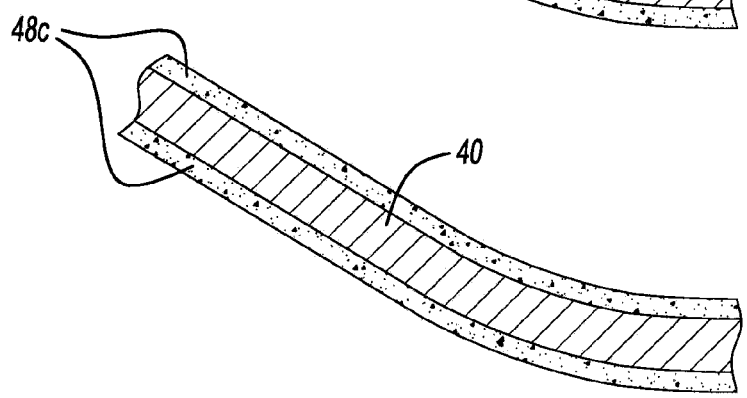
FIG. 13 is a cross-sectional view similar to that of FIG. 5, but illustrating the heat sink as coupled to the interior and the exterior of the cover.

It will be appreciated that while the heat sink 48 has been illustrated and described thus far as being located within the axle housing assembly 40, the disclosure, in its broadest aspects, may be constructed somewhat differently. For example, the heat sink 48b can be coupled to the exterior of the axle housing assembly 40 as illustrated in FIG. 12, or the heat sink 48c could be coupled to both the interior and exterior of the axle housing assembly 40 as illustrated in FIG. 13. To the extent that the heat sink is disposed on the exterior of the axle housing assembly 40, the heat sink can include portions, such as fingers, that can be exposed to air currents when a vehicle (not shown) that employs the rear axle 22 is operated. Such portions of the heat sink could be formed to minimize drag, or could be formed to deflect air against the axle housing assembly 40 to increase the convection cooling of the rear axle 22.

While the rear axle 22 has been illustrated and described as being a Salisbury-type axle, it will be appreciated that the disclosure, in its broadest aspects, need not be limited to any particular type of axle. For example, the rear axle 22 could be a banjo-type axle and the heat sink 48 could be coupled to a rear cover (not shown) that is fixedly and non-removably coupled to a remainder of the axle housing (not shown) via welding. Moreover, it will be appreciated that the teachings of the present disclosure need not be limited to rear axles but could be utilized in any type of axle or driveline component, including differentials, viscous couplings, and transfer cases.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An axle assembly comprising:
an axle housing that defines an aperture;
a differential received in the aperture in the axle housing;
an input pinion coupled to the axle housing and adapted to transmit a rotary input to the differential;
a pair of axle shafts coupled to the differential, the differential transmitting rotary power from the input pinion to the axle shafts; and
a cover removably coupled to the axle housing to close the aperture in the axle housing, the cover having a first layer that is formed of a ferrous material and a second layer that is formed of another material having a thermal conductivity that is greater than about 1.30 W/cm° K., the first and second layers being in thermal communication to transmit heat therebetween, the second layer not passing through the first layer and forming a heat sink on either an interior surface of the first layer or on an exterior surface of the first layer.

2. The axle assembly of claim 1, wherein the another material is selected from a group consisting of aluminum, copper, magnesium and combinations thereof.

3. The axle assembly of claim 1, wherein the second layer is a discrete member that is secured to the first layer.

4. The axle assembly of claim 3, wherein the second layer is coupled to the first layer with a thermally conductive adhesive.

5. The axle assembly of claim 3, wherein a layer of braze compound or solder compound secures the second layer to the first layer.

6. The axle assembly of claim 3, wherein a plurality of threaded fasteners secure the second layer to the first layer.

7. The axle assembly of claim 3, wherein a portion of the second layer extends outwardly from the first layer so as to be separated therefrom by a space.

8. An axle assembly comprising:
an axle housing assembly;
a differential disposed in the axle housing assembly;
an input pinion coupled to the axle housing assembly, the input pinion being adapted to transmit a rotary input to the differential;
a pair of axle shafts coupled to the differential and housed in the axle housing assembly; and
a heat sink coupled to the axle housing assembly, the heat sink being formed of a material having a thermal conductivity that is greater than a thermal conductivity of the axle housing assembly;
wherein the heat sink does not consist entirely of a chrome plating, a zinc plating or a cadmium plating; and
wherein the axle housing assembly includes a housing structure and a cover that is removably coupled to the housing structure and wherein the heat sink is coupled to an exterior surface of the cover or an interior surface of the cover and does not extend through the cover.

9. The axle assembly of claim 8, wherein the heat sink is formed of a material selected from a group consisting of aluminum, copper, magnesium and combinations thereof.

10. The axle assembly of claim 8, wherein the heat sink is a discrete member that is secured to the axle housing assembly.

11. The axle assembly of claim 10, wherein at least one of a thermally conductive adhesive, a threaded fastener, a solder material and a brazing compound secures the heat sink to the axle housing assembly.

12. An axle cover for an axle assembly, the axle cover comprising:
a first member having a body portion and a flange portion that is disposed about a perimeter of the body portion, the body portion having a three-dimensionally contoured surface, the flange portion being adapted to be coupled to an axle housing, the first member being formed of a first material having a first thermal conductivity; and
a second member formed of a second material having a second thermal conductivity that is greater than the first thermal conductivity, the second member being coupled to the body of the first member and forming a heat sink on an exterior surface of the first member or an interior surface of the first member that is configured to facilitate heat transfer between the first and second members;
wherein the second member does not consist entirely of a chrome plating, a zinc plating or a cadmium plating and wherein the second member does not extend through the first member.

13. The axle cover of claim 12, wherein the first material is steel and the second material is selected from a group consisting of aluminum, copper, magnesium, zinc and combinations thereof.

14. The axle cover of claim 12, wherein the first material is cast iron and the second material is selected from a group consisting of aluminum, copper, magnesium, zinc and combinations thereof.

15. The axle cover of claim 12, wherein the first material is aluminum and the second material is copper.

16. The axle cover of claim 12, wherein the second member is a discrete structure that is coupled to the first member.

17. The axle cover of claim 12, wherein a plurality of through-holes are formed through the flange.

* * * * *